(12) United States Patent
Sereboff

(10) Patent No.: US 6,509,385 B2
(45) Date of Patent: Jan. 21, 2003

(54) TRAUMA MITIGATION AND PRESSURE REDUCING COMPOSITION

(76) Inventor: Joel L. Sereboff, 2215 Millridge Rd., Owings Mill, MD (US) 21117

( * ) Notice: Subject to any disclaimer, the term of this patent is extended or adjusted under 35 U.S.C. 154(b) by 0 days.

(21) Appl. No.: 09/924,848

(22) Filed: Aug. 8, 2001

(65) Prior Publication Data

US 2002/0042454 A1 Apr. 11, 2002

Related U.S. Application Data

(63) Continuation-in-part of application No. 09/923,911, filed on Aug. 7, 2001.
(60) Provisional application No. 60/223,633, filed on Aug. 8, 2000.

(51) Int. Cl.$^7$ ................................................ C08J 9/236
(52) U.S. Cl. ........................... 521/59; 521/55; 523/218; 523/219; 36/71.5; 36/89; 36/93
(58) Field of Search ...................... 521/55, 59; 36/71.5, 36/89, 93; 523/218, 219

(56) References Cited

U.S. PATENT DOCUMENTS

| | | | | |
|---|---|---|---|---|
| 4,038,762 | A | * | 8/1977 | Swan, Jr. |
| 4,108,928 | A | * | 8/1978 | Swan, Jr. |
| 4,243,754 | A | | 1/1981 | Swan, Jr. |
| 4,252,910 | A | | 2/1981 | Schaefer |
| 5,421,874 | A | | 6/1995 | Pearce |
| 5,590,430 | A | * | 1/1997 | Sereboff |
| 5,645,603 | A | | 7/1997 | Peters |
| 6,197,099 | B1 | | 3/2001 | Pearce |

* cited by examiner

*Primary Examiner*—Morton Foelak
(74) *Attorney, Agent, or Firm*—Debra Z. Anderson; Daniel P. Cillo; Eckert Seamans Cherin & Mellott, LLC

(57) ABSTRACT

This invention provides deformable low density trauma mitigation or pressure reducing composition comprising a viscous fluid and a plurality of macroparticulates and, optionally, microparticulates dispersed within the viscous fluid. The viscous fluid can comprise a water/oil emulsion, a glycerin/water mixture, a plasticizer or the like. In a further embodiment the composition comprises a viscous fluid and an enhancer which is a polytetrafluoroethylene-molybdenum disulfide combination.

21 Claims, No Drawings

TRAUMA MITIGATION AND PRESSURE REDUCING COMPOSITION

CROSS-REFERENCE TO RELATED APPLICATION

This Application is a continuation-in-part of the Application entitled "Gel Filled Trauma Mitigation Device and Composition Therefore", filed Aug. 7, 2001 and which claims the benefit under 35 U.S.C. 119(e) of provisional application Serial No. 60/223,633, filed Aug. 8, 2000.

FIELD OF THE INVENTION

This invention relates to a composition comprising a viscous fluid, macroparticulates such as foamed polystyrene, polypropylene, or polyethylene beads, and ceramic microparticulates, to be used in various articles or devices to impart improved mitigation of the impact of trauma or an improved reduction in pressure.

BACKGROUND OF THE INVENTION

Various compositions, articles and devices for reducing the impact of collision or reducing pressure are known in the art. For example, it is known to make impact resistant molded articles out of polystyrene or similar resin as described in U.S. Pat. No. 6,153,698, and impact resistant molded articles out of polypropylene for use in automobile inner and outer trim, as described in U.S. Pat. No. 6,124,934. It is also known to make fluid or fluid/particulate filled cushions. In some prior art types of liquid filled or deformable cushions, water is used as a prime constituent of the fluid compositions, as described in prior art U.S. Pat. No. 5,100,712. However, compositions having primarily water are too high in weight, a drawback when the filled articles are to be used as padding, for example in sports helmets, or inside articles fashioned to provide impact resistance in vehicles. Systems which are primarily water also have unsatisfactory rheological characteristics because they are newtonion. Other prior art fluid compositions for cushions include mineral oil or alcohol liquids as described in U.S. Pat. No. 5,093,138; these suffer from similar Theological or density disadvantages described for the water-based compositions.

Fluid/particulate compositions are described, for example, in U.S. Pat. Nos. 5,590,430 and 5,475,882, incorporated herein by reference, which provide a fluid composition which includes ceramic and plastic microspheres. While suitable for a cushion, plastic microspheres are not effective in providing appropriate resistance to high levels of trauma when used in articles in an externally imposed trauma environment such as that found in a collision of an automobile. Plastic microspheres are not suitable in high temperature situations and are also expensive, so that compositions for use in large articles are high in cost. U.S. Pat. No. 5,421,874 describes a similar fluid/particulate composition for use in cushions. However, there is no description in the prior art of a low density fluid/particulate composition suitable for providing impact resistance, trauma mitigation or pressure reduction, using lower cost materials.

SUMMARY OF THE INVENTION

The present invention is directed to a low density composition comprising a viscous fluid, macrosphere particulates of a foamed polymer such as polystyrene, polypropylene, or polyethylene, alone or in combination with ceramic microparticulates, which in one embodiment can be used to mitigate or dissipate the impact of trauma. The macroparticulates of the present invention, when consisting of foamed polymer beads, are an inexpensive, low-density material which can impart a greatly increased mass to a composition without additional weight, suitable for use in large articles. When low density or rapid displacement is not a particular concern, ground rubber tire particles can also be used as the macroparticulates. Use of either type of macroparticulate, when used in compositions of the present invention, will provide an improved mitigation of the impact of trauma. For example, the composition can be used in devices placed in the footwell of motor vehicles (or in other locations in the vehicle), or in airplane seats, to reduce the impact of a collision. The composition can also be used, for example, in bicycle helmets, chest or knee pads and sport helmets worn by hockey and football players, to reduce injury due to collision during play.

In another embodiment, this invention is directed to a composition for insert within a flexible cushion or other type of padding to be used, for example, in crutch pads or other orthopedic devices and which can reduce the pressure felt by a person when using the cushion as a seat or the device including the padding. The composition can also be used in the dual layered cushions disclosed in U.S. Pat. No. 5,195,199, incorporated herein by reference, or the '430 patent described above. The composition of the present invention can also be used in combination with the compositions of the '430 and '882 patents.

It is an object of the present invention, therefore, to provide a low density composition which imparts improved mitigation of the impact of trauma.

It is an additional object of the invention to provide a low density composition which can be used to reduce the amount of pressure felt by a person when using an article or device filled with this composition.

It is a further object of the present invention to provide a low density composition which can withstand higher temperatures experienced by vehicles in extreme environments.

It is a further object of the present invention to provide a low density composition comprising a viscous fluid in combination with macroparticulates and ceramic microspheres, suitable for use in trauma mitigation devices.

These and other objects of the invention will be more fully understood from the following description and the claims appended hereto.

DETAILED DESCRIPTION OF PREFERRED EMBODIMENTS

The present invention provides a deformable low density trauma mitigation or pressure reducing composition comprising a viscous fluid in an amount of about 50–80% by weight of the total composition, a plurality of macroparticulates dispersed within the viscous fluid, and, optionally, a plurality of ceramic microparticulates dispersed within the viscous fluid, the particulates of various sizes present in an amount of about 20–50% by weight of the total composition. When used in combination, the ratio of macroparticulates to microparticulates, based on weight, is from about 1:5 to about 1:20; more preferably, the ratio of macroparticulates to microparticulates is between about 1:5 to about 1:10.

As used herein, the term "viscous" refers to a viscosity measurement of from about 300,000 CPS to about 6 million CPS, with a preferred range of about 1 to 4 million CPS.

As used herein, the term "deformable" refers to the ability of the composition to change in shape in response to an external force.

As used herein, the term "macroparticulates" refers to foamed polymer beads comprised of polystyrene, polyethylene, polypropylene, or other air-chambered or blown particles. When low density is not required, ground rubber tire pieces or other types of ground rubber can also be used as the macroparticulates of the present invention. When foamed polymer beads are used, they can be spherically shaped, having an average diameter of about 0.5 mm to 5 mm and average density of about 2–10 lbs/cubic foot. The foamed polymer beads can also be oblong or football shaped (and are approximately of the same size and density of the spherical particles), depending on the desired end use. It is thought that oblong-shaped macroparticulates make the resulting composition more slowly displaceable and better able to repel dynamic forces, although the inventor does not wish to be bound by this. Thus, a composition comprising oblong macroparticulates might be better suited for use in knee pads to be worn by a football player. In contrast, use of spherical macroparticulates results in a more easily displaced composition which is better suited to repel static forces, e.g., better suited for use in articles such as seats. When ground rubber tire pieces are used as the macroparticulates, they will preferably be in the size range of about 1/8 to 5/16 inch.

Preferred macroparticulates of the present invention are the foamed polymer beads; most preferred are the polypropylene beads sold under the tradename EPERAN available from Kaneka Texas Corporation of Bayport, Tex.

As used herein, the term "microparticulates" refers to ceramic microspheres or other rigid walled microparticulates composed of glass, metal or the like, having a size range of between about 75–400 microns. Preferred are ceramic microspheres produced by PQ Corporation of Valley Forge, Pa. under the tradename EXTENDOSPHERES CG CERAMIC MICROSPHERES™. Ceramic microspheres have certain advantageous properties, such as low density, non-combustibility, and are less easily shattered than glass.

An additional advantage of using the ceramic microspheres is that once the microspheres are blended with the viscous fluid, this combination maintains a homogeneity for an extended period. Thus, there is no congealing or agglomeration of microparticulates in the articles or devices where the composition is used. The spherical diameter of the microparticulates used ranges between about 75 and 400 microns.

The composition of the present invention floats around in the articles designed to enclose it, for example in a footwell of an automobile. On impact, heat is generated and dissipated by the interaction between the viscous fluid and the macro- and microparticulates in the fluid. It is thought that the macroparticulates in particular provide a greater low density volume with which to absorb the impact of a collision.

In one embodiment, the viscous fluid is comprised of a plasticizer. Plasticizers are generally small organic molecules that act as lubricants between long polymer chains and are generally added to plastics to keep them from becoming brittle at room temperature. Plasticizers useful in the viscous fluid must be relatively non-volatile liquids. Preferred plasticizers of the present invention are generally colorless and are chosen from the phthalate ester chemical family, in particular, an alkyl phthalate. Most preferred is a diisononyl phthalate, as it provides the appropriate physical properties. The plasticizer generally has a specific gravity approximating 0.97, with a density range approximating 0.8–1.2 gm/cc. While batches of the plasticizer can be prepared in a range of densities, the preferred density is 1.0 gm/cc.

Diisononyl phthalate has low flammability, being flammable only at temperatures above the flash point (approximately 415° F.). This is a desirable property when the composition is to be used in an article for mitigating the impact of a collision, where fire hazard is a concern. In addition to having the necessary physical properties, this plasticizer can be used in a wide range of environments and has minimal toxicity with inhalation (lung) or skin contact at ambient temperatures.

In a preferred embodiment, the composition of the present invention comprises a viscous fluid of a water/glycerin mixture, a thickener and a preservative. Typically, about 60–80 parts by weight of glycerin to about 20–40 parts by weight of water will be used. This is an ideal ratio to prevent freezing and works as a natural antifreeze. A thickener will be used in an amount of about 3% by weight of the total composition; suitable thickeners include monoisopropanolamine, polyacrylic acid, calcium carbonate, kaolin clay, fumed silica, alginates, heteropolysaccharides, carageenan, cellulose derivatives, and other thickeners known in the art.

A preferred thickener is monoisopropanolamine. It has been found that monoisopropanolamine enhances the rheology of the fluid and particulate combination. Polyacrylic acid can also be used, as it has excellent dispersing properties and as a wetting agent, even in an oil phase of an emulsion.

Suitable preservatives include quaternary ammonium compounds such as benzalkonium chloride, methyl or propyl paraben, potassium sorbate, or other similar preservatives known to those skilled in the art. Gamma radiation can also be used to protect against growth of microorganisms. Typically, an effective amount of a preservative will be used to avoid proliferation of microorganisms.

In a further embodiment, the viscous fluid is comprised of an emulsion, a surfactant, a preservative and a thickener. Preferred is an oil and water emulsion. A surfactant is added to lower the interfacial tension between the oil and the water. Any surfactanct known to one skilled in the art can be used; preferred surfactancts are selected from the group consisting of triethanolamine-oleate and triethanolamine-stearate, Shou's oil (oxidized vegetable oil), lanolin, lecithin (a nontoxic emulsifier), potassium arabate (from acacia) and an acrylic polymer sold under the trade name "Pemulen TR-2", available from BF Goodrich of Cleveland, Ohio. Most preferred are triethanolamine-oleate, triethanolamine-stearate and Pemulen. If it is anticipated that the composition will come in intimate contact with the body, lanolin or lecithin should be used.

The oil and water emulsion will contain a range of about 65 to 90 volume percent vegetable oil, about 15 to 35 volume percent water and about 5 to 10 volume percent surfactant or emulsifying agent. Suitable vegetable oils include soybean oil, pine oil, linseed oil, sunflower oil, canola oil, peanut oil and mixtures thereof. Preferred is soybean oil; preferably, the water is deionized or distilled.

In an additional embodiment, the viscous fluid is comprised of oil (such as a vegetable oil as described above), about 0.1 to 3% by weight of a preservative and about 2–10% by weight of a thickener such as fumed silica.

In yet a further embodiment, the viscous fluid in an amount of about 50–95% by weight is combined with an enhancer in an amount of about 5–50% by weight of the total composition. In this embodiment, the viscous fluid is the glycerin/water combination as described above. Optionally, macroparticulates and/or microparticulates can be added to the viscous fluid/enhancer composition; when used, the macro/microparticulates will be present in an amount of about 20–50% by weight of the total composition.

As used herein, the term "enhancer" is defined as referring to a combination of two substances, preassociated fibrillatable polytetrafluoroethylene (PTFE) particles and molybdenum disulfide particles ($MoS_2$), as described in U.S. Pat. No. 5,645,603, and incorporated herein by reference. The enhancer of the present invention is a preassociation of fibrillatable PTFE particles such as that sold under the tradename FLUON CD1 having diameters in the range of about 100 to about 600 microns, and $MoS_2$ particles having an average particle size in the range of about one to about ten microns and being largely adherent to the fibrillatable PTFE particles. The enhancer forms a fibrous network within the viscous fluid, and the amount of enhancer can be varied depending on the density of the network desired. Optionally, macroparticulates and/or microparticulates can be used in addition to the enhancer. When combined with the viscous fluid, the enhancer forms a fibrous network that can dissipate heat in a manner similar to that of macro/microparticulates.

EXAMPLES

The following examples are intended to illustrate the invention and should not be construed as limiting the invention in any way.

Example I
Glycerin/water Mixture

An embodiment using the glycerin/water mixture as the viscous fluid can be prepared as follows: Use about 60–80 parts by weight of glycerin to 20–40 parts by weight of water. In a 55 gallon drum, mix 38.76 kg glycerine is mixed wth 3.16855 kg EPERAN foamed polymer beads and mixed at high shear. While continuing to mix at high shear, 12.11816 kg water is added. Next, 31.68605 kg ceramic microspheres are added while mixing is continued at low shear, and monoisopropanolamine (available under the tradename LEVALIN from Bayer Corporation, Leverkusen, Germany) is added in an amount of 3.696 kg, also under low shear mixing. Between about 0.1–3% by weight of a preservative can also be added.

Example II
Oil, Preservative, Thickener

Thirteen hundred (1300) pounds soybean oil, sunflower oil, pine oil or linseed oil is blended with 1.9 lbs. of a preservative (Henkel's COVI-OX T-70 or other quaternary ammonium compound) with a laboratory dispersator (or mixer on a larger scale) until smooth. Fumed silica (80 lbs.) is added and dispersed well using high shear and then degassed by placing the fluid in a vacuum mixer and agitating to release bubbles. The macroparticulates and ceramic microspheres (350 lbs., in a ratio of about 10:1 microparticulates to macroparticulates) are then added and the composition is blended to a smooth mixture with low shear and low speed. Depending on batch size, this is done by a planatary mixer that is used at less than 100 rpm. The viscosity at 25° C. is about 1,500,000 cps at 0.5 rpm and about 147,000 cps at 5.0 rpm, TB spindle and the "apparent" density using a Gardner weight per gallon cup, 8.32 mL volume is 5.12 lbs. per gallon or about 0.614 gm/cc. This is measured by standard laboratory procedure.

Example III
Water/oil Emulsion

Oil and water are combined with intermittent agitation, after which preservatives such as quaternary ammonium compounds (benzalkonium-chloride 0.05 to 1.5 volume percent or Henkel's COVI-OX T-70 in about 0.05 to 1.5 volume percent) are added. The mixture is then thickened to the desired viscosity with a suitable thickening agent such as 0.4 to 0.5 volume % of monoisopropanolamine (available under the tradename LEVALIN from Bayer Corporation, Leverkusen, Germany), or precipitated calcium carbonate of about 0.8 to 1.4 volume percent. This mixture is dispersed well at high shear and then degassed. If Pemulen is used, another thickener may not be needed.

At this point, the macroparticulates (available under the trade name EPERAN from Kaneka Texas Corporation of Bayport, Tex.) and ceramic microspheres (EXTENDOSPHERES CG) are added. The macroparticulates and microspheres are added in a ratio, by weight, of about 1:7.5. The macrospheres and microspheres lower the density of the mix. More thickening agents such as precipitated calcium carbonate may be added to reach a desired viscosity. A preferred viscosity is about 1,500,000 cps at 0.5 rpm and about 147,000 cps at 5.0 rpm using a Brookfield model HBT viscometer, TB spindle. The entire mixture is then blended smooth at low shear at low speed. The density of the gel ranges from about 3.5 to 6.5 pounds per gallon depending upon the ratio of macroparticulates to microparticulates.

Example IV
Water/oil Emulsion with Pemulen TR-2

Two parts by weight Pemulen TR-2 is added to the vegetable oil phase of 30 parts oil. Seventy parts water are added to the Pemulen TR-2 and oil. 18% NaOH is added 1 lb base/1 lb Pemulen TR-2 to modify the pH between about 6 and 8, preferably about 7. The stability of the emulsion is then measured. If not stable then the amount of Pemulen TR-2 is then reduced by reduction of volume percent of Pemulen TR-2 to oil and water. The emulsion is mixed at moderate shear of less than about 1000 rpm; preferably 300–500 rpm to avoid degrading the emulsion. If freezing is a concern, glycerin can be added. A preservative such as gamma radiation or methyl or propyl paraben can be used to prevent growth of microorganisms.

The emulsion is then degassed as described above, followed by addition of the macroparticulates and the ceramic microspheres, in a ratio of about 1:10. The emulsion is then mixed at low shear as described above. The density of the composition ranges from about 3.5 to 6.5 pounds/gallon depending upon the ratio of macroparticulates to ceramic microspheres.

Whereas particular embodiments of this invention have been described above for purposes of illustration, it will be evident to those skilled in the art that numerous variations of the details of the present invention may be made without departing from the invention as defined in the appending claims.

What is claimed is:

1. A deformable low density trauma mitigation and pressure reducing composition comprising:
    a viscous fluid in an amount of about 50–80% by weight of the total trauma mitigation or pressure reducing composition; and
    a plurality of macroparticulates selected from the group consisting of foamed polymer having a diameter of from 0.5 mm to 5 mm and particulate rubber having a diameter of from ⅛ to 5/16 inch and mixtures thereof, in an amount of about 20–50% by weight of the total trauma mitigation or pressure reducing composition, disposed within said viscous fluid.

2. The composition of claim 1, further comprising a plurality of microparticulates dispersed within said viscous fluid, so that the total amount of macroparticulates and microparticulates combined is about 20–50% by weight of the total trauma mitigation or pressure reducing composition, and the ratio of macroparticulates to microparticulates, based on weight, is between about 1:5 and 1:20.

3. The composition of claim 1 where said foamed polymer macroparticulates are comprised of at least one material selected from the group consisting of polystyrene, polyethylene, and polypropylene.

4. The composition of claim 1, wherein said macroparticulates are comprised of polypropylene.

5. The composition of claim 1 wherein said composition has a density of about 3.5 to 6.5 lbs/gallon, the viscous fluid has a viscosity of between 1 to 4 million CPS, and the macroparticles provide a low density volume with which to absorb the impact of a collision.

6. The composition of claim 1 wherein said macroparticulates are spherical particles.

7. The composition of claim 1 wherein said macroparticulates are oblong particles.

8. The composition of claim 2 wherein said microparticulates are ceramic microspheres having a diameter between about 75 to 400 microns.

9. The composition of claim 1 wherein said viscous fluid is comprised of vegetable oil, a preservative and a thickener.

10. The composition of claim 9 wherein said vegetable oil is selected from the group consisting of soybean oil, linseed oil, pine oil, sunflower oil, canola oil, peanut oil and mixtures thereof.

11. The composition of claim 1 wherein said viscous fluid is comprised of a glycerin/water mixture, a preservative and a thickener.

12. The composition of claim 1 wherein said viscous fluid is comprised of an emulsion, a preservative, a surfactant and a thickener.

13. The composition of claim 12 wherein said emulsion is an oil and water emulsion.

14. The composition of claim 13, wherein said oil is selected from the group consisting of soybean oil, linseed oil, pine oil, sunflower oil, canola oil, peanut oil.

15. The composition of claim 1 wherein said viscous fluid is comprised of a plasticizer, a thickener and a preservative.

16. The composition of claim 15 wherein said plasticizer is an alkyl phthalate.

17. A deformable low density trauma mitigation and pressure reducing composition comprising:

a viscous fluid in an amount of about 50–95% by weight of the total trauma mitigation or pressure reducing composition; and a mixture of fibrillatable polytetrafluoroethylene and molybdenum disulfide particles in an amount of about 5 to 50% by weight of the total trauma mitigation or pressure reducing composition.

18. The composition of claim 17, further comprising a plurality of macroparticulates or microparticulates disposed within said viscous fluid in an amount of about 20–50% by weight of the total trauma mitigation or pressure reducing composition, where the viscous fluid has a viscosity of between about 300,000 CPS to 6 million CPS, and where the fibrillatable polytetrafluoroethylene particles have diameters in the range of about 100 to 600 microns and the molybdenum disulfide particles have an average particle size range of about 1–10 microns, where the particles form a fibrous network within the viscous fluid that can dissipate heat.

19. The composition of claim 17, further comprising a plurality of macroparticulates and microparticulates disposed within said viscous fluid in an amount of about 20–50% by weight of the total trauma mitigation or pressure reducing composition, the viscous fluid has a viscosity of between 1 to 4 million CPS, and where the ratio of macroparticulates to microparticulates, based on weight, is between about 1:5 and 1:20.

20. The composition of claim 17 wherein said viscous fluid is comprised of a glycerin/water mixture, a preservative and a thickening agent.

21. The composition of claim 1, wherein said viscous fluid has a viscosity of between about 300,000 CPS to 6 million CPS.

* * * * *